June 8, 1937.  W. C. AGERELL ET AL  2,083,135
DISPENSING CONTAINER
Filed Sept. 9, 1935  2 Sheets-Sheet 1
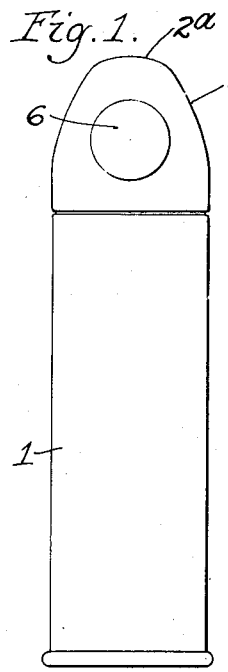
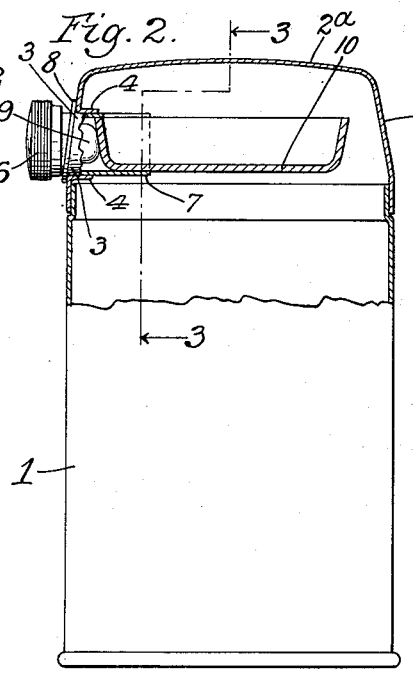
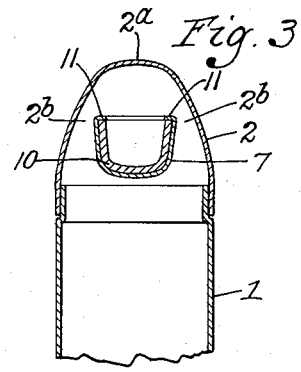
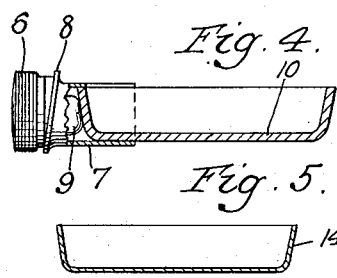
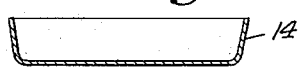
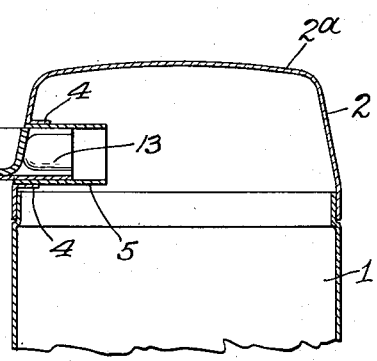
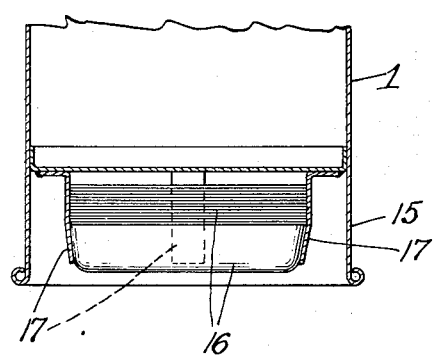
Inventors
Harold Asher
William C. Agerell
by Parker & Carter
Attorneys.

June 8, 1937.  W. C. AGERELL ET AL  2,083,135
DISPENSING CONTAINER
Filed Sept. 9, 1935  2 Sheets-Sheet 2
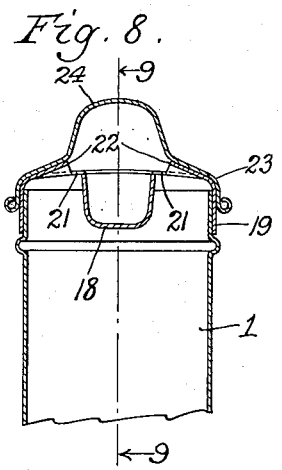
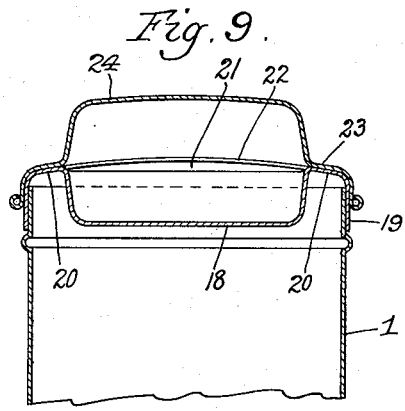
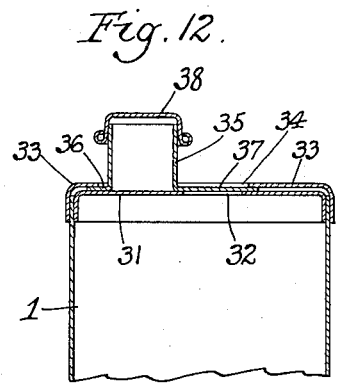
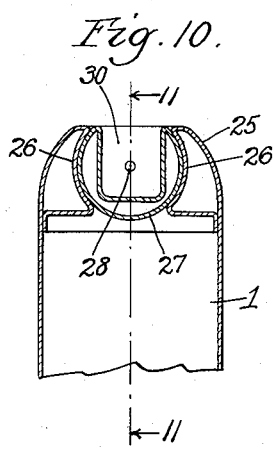
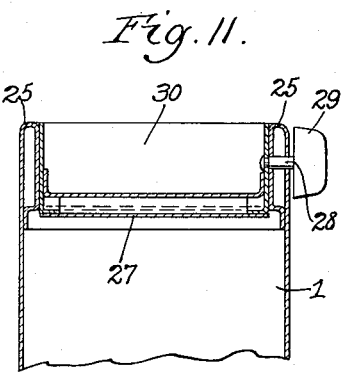
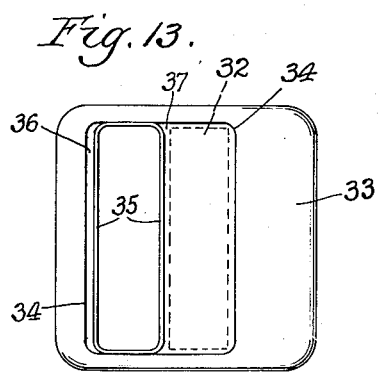
Inventors
Harold Asher
William C. Agerell
by Parker Porter
Attorneys.

Patented June 8, 1937

2,083,135

UNITED STATES PATENT OFFICE 2,083,135

DISPENSING CONTAINER

William C. Agerell and Harold Asher, Chicago, Ill.

Application September 9, 1935, Serial No. 39,758

6 Claims. (Cl. 221—104)

This invention relates to a dispensing container and has for one object to provide a container which will dispense a measured quantity of material, preferably dry, and which provides in addition a receptacle in which the measured quantity is retained after being removed from the main container and from which it can be withdrawn by a brush or otherwise.

Another object of the invention is to provide a means for dispensing tooth powder in measured quantities and for retaining a measured quantity in a receptacle of the proper size and shape so that a tooth brush may be dipped into it to receive the powder.

Other objects will appear from time to time in the specification and claims.

The invention is illustrated more or less diagrammatically in the accompanying drawings, wherein:—

Figure 1 is an end elevation of one form of container;

Figure 2 is a side elevation with parts in section and parts broken away;

Figure 3 is a transverse vertical sectional detail, taken at line 3—3 of Figure 2;

Figure 4 is a vertical longitudinal section of the dispensing trough or container removed from the main container;

Figure 5 is a longitudinal section showing a removable dispensing trough;

Figure 6 is a view generally similar to Figure 2, showing a modified form of construction with the dispensing trough in the outer position;

Figure 7 is a vertical section showing the bottom of a modified form of container in which a series of disposable cups has been nested;

Figure 8 is a view generally similar to Figure 3, showing a further modified form in which the dispensing trough is fixed with respect to the main container;

Figure 9 is a longitudinal vertical section taken at line 9—9 of Figure 8;

Figure 10 is a transverse vertical section showing a further modified form;

Figure 11 is a longitudinal vertical section taken at line 11—11 of Figure 10;

Figure 12 is a longitudinal vertical sectional detail showing a further modified form;

Figure 13 is a plan view of the device shown in Figure 12.

Like parts are designated by like characters throughout the specification and drawings.

1 is a container which may be formed of any suitable material. In the form illustrated in the first six figures the container is provided with a top 2, which, after the container has been filled, is ordinarily not removed. It may be given any desired shape. It is preferably rounded as at 2a to form what is in effect a primary trough when the container is inverted. Material within the container flows into the top 2 and into the primary trough portion 2a, past a secondary trough which will be described below, through the clearance spaces 2b. The top 2, as shown, is perforated on one end as at 3 and provided with an inwardly extending sleeve-like portion 4 positioned about the perforation and conforming in shape to it. As shown in Figure 6 an inwardly extending sleeve-like member 5 is supported on the sleeve 4.

A handle member 6 has attached to it a hollow member 7 corresponding generally in shape to the perforation 3 and the interior diameter of the member 4. A stop 8 may be formed on the member 7 and a positioning or limiting member 9 may be formed within the member 7. A dispensing or secondary trough 10 is received at one end within the hollow member 7 and secured therein. A portion of the hollow member 7 may be bent over the trough 10 as at 11, as shown in Figure 3, to retain it in position so that the handle 6, the member 7 and the trough 10 move as a unit and may slide in and out.

In the modified form shown in Figure 6 the extension 5 of the sleeve 4 serves as a further steadying member to support the secondary trough. In this form of the device also the means for carrying the trough is modified. The handle 6, instead of being attached to the relatively short hollow member 7 is attached to an extended hollow trough-like member 12 which exceeds the length of the actual secondary trough 10, and a positioning member 13 is secured within the member 12 to position the trough. Instead of having a trough 10 fixed within the member 12, this may be omitted and one or more removable troughs 14 may be used and thus if the device is being used as a tooth powder dispenser, a separate trough may be used by each person using the device.

A further modification or addition is shown in Figure 7. As shown there the bottom of the container 1 is extended as at 15 and within this a series of cups 16 is nested but held in place by spring arms 17. The cups may be made of paper or other material and are disposable. They may be pulled off, one at a time, inserted in the trough 10 before the device is used and thus, with each use, the cup is destroyed and contamination is avoided.

As shown in Figures 8 and 9, the container or can 1 is generally the same as that shown in the preceding figures but instead of being provided with a removable or withdrawable secondary trough, that trough is stationary. Thus a secondary trough 18 is fixed to a top 19 of the can. This top is normally not removed after the can has been initially filled. The trough is secured to the top as at 20. It may conveniently be made integrally with it and relatively wide clearance spaces are provided as at 21 along the sides of the trough and between them and the upturned edges 22 of the top.

A removable closure 23 is provided which fits over the top of the can or container and is held against accidental displacement by friction or otherwise but is readily removable when desired. It is shaped to provide a primary trough 24 positioned preferably above the secondary trough 18.

The use of the forms of the device shown in the nine figures just described is generally the same. The secondary trough is in position within the container, the container is reversed or inverted, its contents fall downward and flow into the primary trough formed in the lid or top of the container. The container is then restored to its original position and much of the material within the container falls downwardly to the bottom. That which was contained in the so-called primary trough formed in the top or cover of the container, however, largely falls into the secondary trough so that this trough is filled with a measured quantity which is suitable for the purpose intended. For example, in one case there is a sufficient quantity of tooth powder for brushing the teeth. The quantity retained is dependent mainly upon the size and shape of the secondary trough, which will be of such size as to retain the desired quantity.

In the form of the device shown in Figures 1 to 7, inclusive, after the trough has been filled, as above described, it is withdrawn by means of the handle 6 so that the trough is either wholly or partly withdrawn from the container and the brush is now dipped into it to take up the powder contained in it. In one form of the device there is but one secondary trough and it is fixed to the handle 6. In the other form, namely that of Figure 6, the trough may be removable and any number of separate troughs may be inserted for use. Where these, or the paper cups of Figure 7 are to be used, the trough is withdrawn from the container empty and the paper cup or the desired trough is inserted in the holder. Then the entire assembly is returned to the position of Figure 2 and the operation of filling the trough as above described is carried out.

In the form of the device shown in Figures 8 and 9, the trough itself does not move. After it has been filled by reversing the container as above described, the upper cap or closure containing the primary trough is lifted off and the secondary trough which is fixed to the container is now available and the brush may be dipped into it to take up the powder.

In the form of the device shown in Figures 10 and 11 the top 25 of the container is shaped to provide partially cylindrical portions 26 within which a rotary member 27 is mounted and with respect to which it may revolve. A shaft 28 protrudes at one end from this member and a thumb nut or handle 29 is attached to it. Positioned within the rotary member 27 is a trough 30. When the device of these figures is to be used the trough is turned so that it faces inwardly toward the interior of the container. The container is now inverted and the trough is filled. The trough is given about a quarter-turn and this brings its open side opposite one of the rounded portions 26 of the member 25. The container is now restored to its original position and the trough carrying member 27 is rotated to the position shown in Figures 10 and 11 so that its open top faces upwardly and the contents of the trough may be discharged or a brush of the user may be inserted to take up the powder.

In the form of the device shown in Figures 12 and 13, a top 31, provided for the container, has a slot or opening 32 formed in it. A secondary top 33 is positioned over the top 32. This secondary top is cut away as at 34. A trough member 35 is provided along one edge with a flange 36 and along the other edge with a relatively larger flange 37. The trough member 35 has an open top and is closed by a closure 38.

As will be seen from Figure 12, the flange 37 of the trough member 35 in one position covers the slot or opening 32 and prevents discharge from it. The remainder of the top 31 also closes the bottom of the trough 35 and prevents discharge into it. Thus with the parts as shown in Figure 12, no discharge from the container is possible and no discharge into the trough is possible. When the device is to be used, the trough member and its flanges are moved to the right from the position shown in Figure 12 until the bottom of the trough member 35 is in register with the slot 32. In that position material may be discharged through the slot 32 into the trough 35 and to do this the container is inverted. After the trough has been filled and with the container still in the inverted position, the trough is returned to the position of Figure 12 and the flange 37 again closes the slot 32, preventing further discharge from the container; and, since the trough is now positioned over the solid portion of the top 31, discharge from the top back into the container is impossible. The container is now restored to its original position and the cover 38 may be removed to permit discharge of the material from the trough or to permit entrance of a brush to pick up the material.

It will be realized that whereas we have herewith shown and described a practical operative device, nevertheless many changes might be made in the size, shape, number and disposition of parts without departing from the spirit of the invention and, therefore, we wish that our showing be taken as in a sense diagrammatic.

We claim:

1. In combination in a dispensing container, a main container portion having a base, the container portion extending upwardly therefrom, facing upwardly and being open only at its upper end, a cover therefor, removably positioned upon said open upper end, a dispensing trough supported in said cover, projecting inwardly therefrom at right angles to the main length of the container, the cover at a point opposite the base of the container shaped to provide a primary trough-like portion, the dispensing trough facing upwardly toward said primary trough-like portion and comprising in itself a secondary trough, whereby upon reversal of the container its contents move into the primary trough and upon replacement of the container to its original position the contents of the primary trough fall freely into the secondary trough, the secondary trough movably mounted to be withdrawn from the container, and when in such position, to make its contents readily available to a tooth brush and simultaneously blocking access to the interior of the container.

2. In combination in a dispensing container, a main container portion having a base, the container portion extending upwardly therefrom, facing upwardly and being open only at its upper end, a cover therefor, removably positioned upon said open upper end, a dispensing trough supported in said cover, projecting inwardly therefrom at right angles to the main length of the container, the cover at a point opposite the base of the container shaped to provide a primary trough-like portion, the dispensing trough facing upwardly toward said primary trough-like portion and comprising in itself a secondary trough, whereby upon reversal of the container its contents move into the primary trough and upon replacement of the container to its original position the contents of the primary trough fall freely into the secondary trough, the secondary trough movably mounted to be withdrawn from the container, and when in such position, to make its contents readily available to a tooth brush and simultaneously blocking access to the interior of the container, and a removable and disposable trough mounted within said dispensing trough.

3. In combination in a dispensing container having a cover, shaped to form a primary trough-like member, and a secondary trough provided with an open side facing said primary trough-like portion, said secondary trough serving as a receptacle to retain a measured quantity of material and mounted for slidable movement into and out of said cover, said secondary trough when in position within said cover being freely spaced away from it along its sides and one end to provide free passage of material between the trough and the cover, and a removable and disposable liner for said secondary trough.

4. In combination in a dispensing container, a main container body provided with an open upper end, and a cover member fitted upon said body and with it defining the main container cavity as a whole, a movably mounted dispensing trough-like member mounted in said cover and projecting bodily into the main container cavity, said cover shaped to provide a primary trough-like portion, said dispensing trough comprising a secondary trough having an open side faced toward the trough-like portion of said cover, said dispensing trough mounted for movement into and out of said container and when within said container being freely separated from the walls thereof to permit the free passage of the contents of the container between said secondary trough and the walls of the cover, said dispensing trough, when withdrawn from the container, adapted to make available a separated and measured quantity of material from the contents of the container.

5. In combination in a dispensing container, a main container portion having a base, the container portion extending upwardly therefrom, a cover therefor, a dispensing trough supported in said container, projecting inwardly into the main body thereof, the cover shaped to provide a primary trough-like portion, the dispensing trough facing toward said primary trough-like portion, being positioned relatively close thereto and out of contact therewith, and comprising in itself a secondary trough, whereby upon reversal of the container its contents move into the primary trough and upon replacement of the container to its original position the contents of the primary trough fall freely into the secondary trough, the secondary trough movably mounted to be withdrawn from the container, and when in such position, to make its contents readily available to a tooth brush and simultaneously blocking access to the interior of the container.

6. In combination in a dispensing container, a main container portion having a base, the container portion extending upwardly therefrom, a cover therefor, a dispensing trough supported in said cover, projecting inwardly therefrom, into the main body thereof, the cover shaped to provide a primary trough-like portion, the dispensing trough facing toward said primary trough-like portion, being positioned relatively close thereto and out of contact therewith and comprising in itself a secondary trough, whereby upon reversal of the container its contents move into the primary trough and upon replacement of the container to its original position the contents of the primary trough fall freely into the secondary trough, the secondary trough movably mounted to be withdrawn from the container, and when in such position, to make its contents readily available to a tooth brush and simultaneously blocking access to the interior of the container.

WILLIAM C. AGERELL.
HAROLD ASHER.